Patented Dec. 27, 1938

2,141,546

UNITED STATES PATENT OFFICE 2,141,546

ACRYLOXY CARBOXYLIC ACIDS AND THEIR ESTERS

Daniel E. Strain, Wilmington, Del., assignor to E. I. du Pont de Nemours & Company, Wilmington, Del., a corporation of Delaware No Drawing. Application June 5, 1936, Serial No. 83,813

16 Claims. (Cl. 260—78)

This invention relates to a new class of unsaturated esters and to polymerization products derived therefrom. More particularly, it relates to monomeric and polymeric carboxylic acids and esters thereof containing as a substituent the group

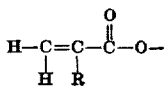

in which R is hydrogen or a hydrocarbon radical.

It is an object of the invention to prepare new and useful compositions of matter. A further object is to prepare monomeric carboxylic acids and their esters containing as a substituent the group

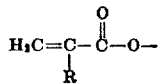

as defined above. A still further object is the preparation of polymers of such acids and their esters. Another object is the preparation of new and useful film-forming materials. Other objects will appear hereinafter.

In accomplishing these objects according to the present invention, it has been found that carboxylic acids and their esters containing as a substituent the group

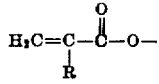

as defined above may be prepared by one of the following reactions: (a) by the reaction of an ester of a halogenated aliphatic carboxylic acid with an alkali metal salt of an acid of the acrylic acid series, or (b) the reaction of a hydroxy carboxylic acid or an ester thereof with an anhydride or acid chloride of an acid of the acrylic acid series. In either case the reaction may be carried out in the presence or absence of a polymerization inhibitor. The product may be purified in any convenient manner and, if desired, polymerized by heat or light in the presence or absence of a polymerization catalyst.

In practicing the invention it has been found that reaction (a) is especially suitable when the halogen of the halogenated aliphatic carboxylic acid ester is present in the alpha-position, that is, the position next to the carboxyl group. The reaction apparently does not proceed satisfactorily when the halogen atom to be replaced is in the beta-position of the halogenated aliphatic carboxylic acid ester. However, carboxylic acids and esters containing as a substituent the group

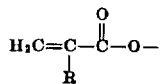

as defined above in the beta-position or in other positions farther removed from the carboxyl group may be obtained by method (b).

The invention will be further illustrated by the following examples in which the quantities are stated in parts by weight.

EXAMPLE I

Preparation of methyl methacryloxyacetate

A mixture composed of 108 parts of methyl chloroacetate, 165 parts of potassium methacrylate, 240 parts of methanol and 2 parts of hydroquinone is refluxed for twenty hours. Potassium chloride forms during the reaction period. After the removal of 160 parts of methanol by distillation, the batch is cooled, diluted with ether, filtered, the salt (KCl) is washed with ether, and the combined filtrate and washings distilled. After the ether and methanol distill off, the methyl methacryloxyacetate distills between 70° and 80° C. at 12 mm. The product is washed with 5% caustic soda solution to remove traces of hydroquinone and is then dried over calcium chloride. (Saponification number 698.4; theory 708.8.) The methyl methacryloxyacetate containing 1% of benzoyl peroxide is transformed to a colorless, transparent polymer by heating one and one-half hours at 100° C. The polymer is soluble in acetone, toluene and ethyl acetate. It is insoluble in water, methanol, and gasoline. It is compatible with cellulose acetate and cellulose nitrate.

EXAMPLE II

Preparation of methylalpha-methacryloxybutyrate

A mixture of 90.5 parts of methyl-alpha-bromobutyrate, 82 parts of potassium methacrylate, 2 parts of hydroquinone, and 160 parts of methanol is refluxed for twenty hours. After the removal of 88 parts of methanol for distillation, the mixture is cooled, diluted with ether, and filtered. The potassium bromide residue is again extracted with ether and the extract added to the original filtrate. On distillation of the ether extract, methyl methacryloxybutyrate is obtained, boiling at 90°–99° C. at 12 mm. After removal of traces of hydroquinone by washing with 5% caustic soda solution and drying over calcium chloride, the distillate is readily polymerized to a colorless, transparent resin by heating at 100° C. in the presence of 1% benzoyl peroxide.

Four (4) parts of the distillate obtained as described in the preceding paragraph and 6 parts of methyl methacrylate monomer containing 0.05 part of benzoyl peroxide is heated for twenty-four hours at 65° C. A bubble-containing mass of a colorless, transparent, hard resin is obtained. Attractive colorless moldings are obtained when this product is pressed for five minutes at 140° C. under about 2000 pounds pressure per square inch.

EXAMPLE III

Preparation of vinyl methacryloxyacetate

Twelve (12) parts of polymerized vinyl chloroacetate is dissolved in 100 parts of methoxyethanol, 6 parts of potassium methacrylate is added, and the solution heated for one hour on a steam bath. On addition of 600 parts of water, a soft resinous material separates from the solution. This soft resin flows out on a hard surface to form a clear adherent film which becomes non-tacky and insoluble on exposure to air or on heating. The material molds to an amber-colored, infusible resin.

Examples I, II and III are illustrative of the preparation of aliphatic carboxylic acid esters containing as a substituent the group

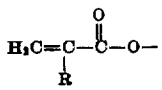

as defined above by the reaction of an alkali metal salt of an acid of the acrylic acid series and monohydric alcohol esters of alpha-halogen aliphatic monocarboxylic acids. The following example is an illustration of the preparation of an aliphatic dicarboxylic acid ester containing as a substituent the group

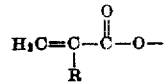

as defined above by the reaction of an alkali metal salt of an acid of the acrylic acid series with monohydric alcohol esters of alpha-halogen aliphatic dicarboxylic acids.

EXAMPLE IV

Preparation of ethyl methacryloxymalonate

A mixture of 80 parts of ethyl bromomalonate, 62 parts of potassium methacrylate, 100 parts of absolute alcohol, and 2 parts of hydroquinone is refluxed for ten hours. The mixture is then filtered. The salt contains a brown, resinous material, soluble in acetone but not readily soluble in ether. An additional quantity of resin can be precipitate by the addition of ether to the filtrate. The ether extracts are distilled. The ethyl methacryloxymalonate distills at approximately 80° C. under 6 mm. pressure. Traces of hydroquinone are removed from the distillate by washing with 5% caustic soda solution, and the ester is dried over calcium chloride (saponification number 680; theory 688.8). The purified ester polymerizes to a colorless, transparent, elastic material upon heating one hour at 100° C. in the presence of 1% benzoyl peroxide. When the purified ester is mixed with an equal weight of methylacrylate monomer containing 0.5% of benzoyl peroxide (based upon the total weight of the two esters) and the mixture is heated twenty-four hours at 65° C., a colorless, tough, elastic mass is obtained which is suitable for use as an adhesive or interlayer in the manufacture of laminated glass.

The following example is an illustration of the preparation of an aliphatic carboxylic acid ester containing as a substituent the group

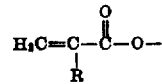

as defined above by the reaction of an anhydride of the acrylic acid series and a dihydric alcohol ester of an alpha-hydroxyaliphatic monocarboxylic acid.

EXAMPLE V

Preparation of glycol alpha-methacryloxypropionate

One mol of glycol dilactate dissolved in 500 parts of toluene is treated with 3 mols of methacrylic anhydride, to which one mol of potassium methacrylate is added (methacrylic anhydride reacts more readily with the glycol dilactate in the presence of potassium methacrylate). The mixture is heated four hours on a steam bath with stirring. It is then cooled, suction-filtered and the residue washed with toluene. Calcium hydroxide and water are added to the filtrate and washings, and the mixture is agitated until the acidic ingredients are removed from the organic layer. The latter is then separated and dried over calcium chloride. The toluene is removed under vacuum distillation. The product is a clear, thin, essentially water-white, neutral liquid, which polymerizes readily on heating as in preceding experiments with a polymerization catalyst such as benzoyl peroxide.

The following example is an illustration of the preparation of an aliphatic carboxylic acid ester containing as a substituent the group

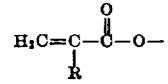

as defined above from a polyhydric alcohol ester of a hydroxy aliphatic monocarboxlic acid in which the hydroxyl group is not in the alpha-position.

EXAMPLE VI

Preparation of glyceryl methacryloxyricinoleate

One hundred (100) parts of castor oil, 61.5 parts of calcium carbonate, and 218 parts of dry benzene are placed in a one-liter, three-necked flask fitted with thermometer, dropping funnel, stirrer and reflux condenser topped with a CaCl₂ tube. The mixture is heated in an oil bath to refluxing (81° C.). The heating is then discontinued and 56.8 parts of methacrylyl chloride are added slowly with stirring, over a sixteen minute period. The reaction mixture is again heated to refluxing (82° C.), during which time copious evolution of HCl occurs. Heating is continued with stirring for approximately five hours, after which the mixture is allowed to cool and stand several days. It is then suction-filtered, the residue is washed with ether and the combined filtrate and washings distilled in vacuo from an oil bath at 50°–55° C. to remove volatile solvents. The product remaining in the distilling flask is dissolved in 360 parts of ether, washed once with 106 parts of 5% caustic soda solution, then twice with 500 parts of water and dried with 50 parts of anhydrous MgSO₄. The ether solution is filtered and the ether is evaporated off in vacuo. The product remaining in the distilling flask is a light brown, viscous oil. When heated with about 1% of benzoyl peroxide, it polymerizes rapidly to a rubbery, friable solid. This polymer is insoluble in toluol, alcohol, ethyl acetate, acetone, and bus-naphtha (low-boiling aliphatic hydrocarbons).

EXAMPLE VII

*Preparation of methyl acryloxybutyrate*

Example II is repeated using 76 parts of potassium acrylate in place of 82 parts of potassium methacrylate. On distillation, methyl acryloxybutyrate is obtained as a colorless liquid boiling at 85°–90° C./11 mm. On heating the inhibitor-free monomer at 100° C. with 1% benzoyl peroxide, very rapid polymerization takes place with the production of a relatively soft, colorless plastic.

Instead of the halogenated or hydroxyaliphatic carboxylic acid esters used in the examples, other halogenated or hydroxyaliphatic carboxylic acid esters may be employed. The ester used may be an ester of a monobasic carboxylic acid with a monohydric or a polyhydric alcohol, or a polycarboxylic acid ester of a monohydric alcohol. For instance, the acid which is esterified with the alcohol to prepare the halogenated or hydroxy acid esters used in this invention may be glycolic, beta-hydroxy-propionic, alpha-, beta- or gamma-hydroxy-butyric acids, tartronic, malic, citric, or an acid containing more than one hydroxyl such as glyceric or tartaric, and the corresponding acids having halogen atoms substituted for the hydroxyl groups. The alcohols with which the acids are esterified may be monohydric (e. g., methyl, ethyl, propyl, butyl, octyl, dodecyl, cetyl, 9-10-octadecenyl, octadecyl, allyl, cyclohexyl, or benzyl alcohol), dihydric (e. g., ethylene glycol, propylene glycol, or other polymethylene glycols), or polyhydric (e. g., glycerol, sorbitol, and homologues thereof). Insofar as is known subject to the conditions given above, that a monobasic carboxylic acid be reacted with a monohydric or polyhydric alcohol and that a polycarboxylic acid be esterified with a monohydric alcohol, any combination of such acids and alcohols as the esters may be used as raw materials, including polymers thereof which are soluble in ordinary solvents, as illustrated, for instance, by Example III.

In carrying out the reactions, it will be understood that the halogenated carboxylic acid esters are only used in reaction (a) supra, whereas the hydroxy carboxylic acid esters are only used in reaction (b). Moreover, as already indicated in reaction (b), the free hydroxyaliphatic carboxylic acids, instead of their esters, can be reacted with anhydrides or acid halides of acids of the acrylic acid series, the reaction between the acrylic anhydrides or acid chlorides preferentially taking place at the hydroxyl group rather than the —OH group attached to the carbonyl group. The free halogenated acids, however, have not been satisfactorily employed in reaction (a).

While the invention is especially desirable in the preparation of aliphatic carboxylic acids containing as a substituent the group

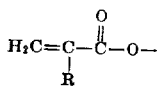

as defined above, other carboxylic acids containing as a substituent the group

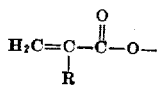

as defined above, for example, the aromatic carboxylic acids and hydroaromatic carboxylic acids or their esters containing as a substituent the group

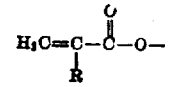

as defined above, may be prepared by one of the two types of reactions set forth above. For instance, according to the procedure of reaction (b), the aromatic and hydroaromatic hydroxy carboxylic acids or their esters with any of the alcohols enumerated can be reacted with anhydrides or acid chlorides of acids of the acrylic acid series. Thus, salicylic, hexahydrosalicylic, para-hydroxybenzoic, hydroxynaphthoic, and partially hydrogenated hydroxynaphthoic acids and their esters with any of the alcohols previously enumerated can be reacted with anhydrides or acid chlorides of the acrylic acid series, e. g., acrylic or methacrylic anhydride or acid chloride, to produce the corresponding aromatic or hydroaromatic carboxylic acids and esters containing as a substituent the group

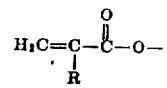

as defined above. The procedure of reaction (a) above can be used with aromatic or hydroaromatic acids and esters having halogenated aliphatic side chains, but halogen atoms in the ring nuclei of aromatic or hydroaromatic acids or esters will not react satisfactorily with alkali metal salts of acids of the acrylic acid series. As examples of aromatic acids containing reactive substituents in the side chain may be mentioned mandelic, tropic, ortho-hydroxymethylbenzoic acid, and halogenated derivatives thereof containing a halogen atom in place of one or more of the hydroxyl groups of the side chain.

In general, the preferred acid salts, anhydrides or acid chlorides employed in the reaction with halogenated or hydroxy carboxylic acids and their esters are the corresponding derivatives of acids having the general formula

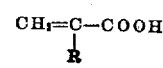

in which R is hydrogen, alkyl (e. g., methyl, ethyl, propyl, or higher homologues), or aryl (e. g., phenyl, naphthyl or benzyl). Especially desirable results have been obtained with the alpha-alkyl-substituted derivatives, and particularly methacrylic acid salts, anhydride and acid chloride.

It may be desirable in some cases to react salts of polymeric (instead of monomeric) acids of the acrylic series with halogenated aliphatic carboxylic acid esters. Moreover, in cases where the salts of acids of the acrylic series are reacted with polymerized halogenated aliphatic carboxylic acid esters, as in Example III, the amounts of such salts employed may be varied over wide limits to react with any desired percentage of the halogen present. Polymerized halogenated esters of the type of vinyl chloroacetate polymer are essentially esters of polyhydric alcohols containing more than one atom of halogen per molecule of the ester, so that varying amounts of alkali salts of acids of the acrylic series may be reacted with them to replace part or all of the halogen, as desired. The properties of the products can thus be varied. Vinyl esters of halogenated or hydroxyaliphatic carboxylic acids, such as vinyl chloroacetate or vinyl glycolate, can also be interpolymerized with one or more other suitable polymerizable substances such as those mentioned below, and the interpolymers can then be reacted with alkali metal salts, acid chlorides, or anhydrides of acids of the acrylic series, as the case may require, essentially as described in the examples. For example, potassium methacrylate or acrylate can be reacted with an interpolymer of a mixture of 50% vinyl chloroacetate and 50% ethyl acrylate. As another example, potassium methacrylate or acrylate can be reacted with an interpolymer of a mixture of 25% vinyl chloroacetate and 75% butadiene. Such products can be prepared substantially halogen-free. In cases where interpolymers of vinyl chloroacetate and vinyl chloride are reacted with alkali salts of acids of the acrylic series, the remaining halogen (in the polyvinyl chloride) would be inert.

It will be recognized from the examples that the carboxylic acid esters containing as a substituent the group

as defined above prepared according to this invention can be prepared in either monomeric or polymeric forms. The monomeric compounds prepared in accordance with the invention have the following general formula

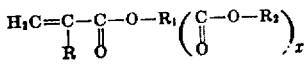

wherein R is hydrogen or a monovalent hydrocarbon radical, $R_1$ is a hydrocarbon radical whose valence is $x+1$ and which contains for example one to eighteen carbon atoms, $x$ is an integer from one to three and $R_2$ is hydrogen or a monovalent hydrocarbon radical. Any of the monomeric forms of the compositions prepared according to this invention can be polymerized as illustrated in the examples, or by other methods of polymerization known to those skilled in the art.

Interpolymers of two or more different compositions prepared as described herein can also be prepared according to this invention. Moreover, any of the monomeric compositions of this invention can be interpolymerized with other suitable polymerizable substances, such as vinyl chloroacetate, vinyl acetate, vinyl chloride, alkyl vinyl ketones such as methyl or ethyl vinyl ketone, styrene, acrylic and methacrylic acids and their esters such as methyl acrylate, methyl or ethyl methacrylate, acrylic and methacrylic acid amides or nitriles, butadiene, isoprene, chlorobutadiene, itaconic and fumaric acids and their esters, amides, nitriles, and related compounds.

Instead of hydroquinone, other polymerization inhibitors can be used or, if desired, the reaction can be carried out in the absence of a polymerization inhibitor. Similarly, polymerization catalysts other than benzoyl peroxide can be used. Catalysts normally used for polymerizing vinyl esters and acrylic esters are suitable. The polymerization can also be effected without a polymerization catalyst if desired, but the process would be somewhat slow under such conditions. Properties of the polymerization products are modified to a certain extent by the amount of catalyst used and the temperature and concentration at which polymerization is conducted.

Polymerization may be carried out in solvents for both the monomer and polymer, or in a solvent for the monomer which is a non-solvent for the polymer.

The products of the invention, in general, may be used as coating compositions per se or modified with natural or synthetic resins, especially other methacrylate-type resins, or with cellulose derivatives, oils, waxes, plasticizers, pigments and/or fillers. They may also be used in molding compositions, as safety glass adhesive, other interlayer compositions and for sizing, coating or impregnating fabrics, cloth, paper, regenerated cellulose sheet material, or as adhesives in general. They also may be used as rubber substitutes for many purposes. For any of the foregoing uses, the new products may be applied in the monomeric, partially polymerized or essentially polymerized form. Where an interpolymer is desired, the products may be applied as mixtures of monomers, partially polymerized mixtures or as essentially polymerized co-polymers. The monomeric compounds, when used as constituents of molding, coating and impregnating compositions, may be polymerized in situ by heat or exposure to light. The esters prepared from halogenated or hydroxyaliphatic carboxylic acid esters of polyhydroxy alcohols may be used for making non-thermoplastic products since they become insoluble on polymerization and are heat-hardening.

By careful control of polymerization conditions, the various monomers or compositions containing them can be polymerized to bubble-free, clear, transparent, colored, opaque or pigmented blocks, sheets, rods and tubes from which articles may be formed by sawing, turning, drilling, and similar operations.

The invention has the advantage of providing new types of monomers, polymers and interpolymers by adding a normally polymerizable component to compounds which may or may not be polymerizable. It therefore makes possible the preparation of a wide variety of new and useful materials.

As many apparently widely different embodiments of this invention may be made without departing from the spirit and scope thereof, it is to be understood that I do not limit myself to the specific embodiments thereof except as defined in the appended claims.

I claim:

1. The process which comprises reacting a member of the class consisting of halogenated and hydroxy substituted monocarboxylic acids, esters thereof, halogenated and hydroxy substituted polycarboxylic acids and esters thereof with monohydric alcohols with a substance reactive therewith from the class consisting of alkali salts, anhydrides, and acid halides of acids of the formula

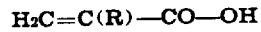

wherein R is a member of the class consisting of hydrogen and monovalent hydrocarbon radicals.

2. The process of claim 1 in which the reaction is effected in the presence of a polymerization inhibitor.

3. The process of claim 1 in which the reaction products are subjected to polymerization.

4. A compound of the class consisting of monocarboxylic acids, esters of said monocarboxylic acids, polycarboxylic acids and monohydric alcohol esters of said polycarboxylic acids, said compounds being further characterized in that they contain, as a substituent in the acid portion of the molecule, the group $$H_2C=C(R)-CO-O$$

wherein R is a member of the group consisting of hydrogen and monovalent hydrocarbon radicals.

5. Polymers of the compounds of claim 4.
6. Coating compositions containing the products of claim 4.
7. Esters of methacryloxy monocarboxylic aliphatic acids.
8. Polymeric esters of methacryloxy monocarboxylic aliphatic acids.
9. Monohydric alcohol esters of methacryloxy monocarboxylic aliphatic acids.
10. Polymeric monohydric alcohol esters of methacryloxy monocarboxylic aliphatic acids.
11. Methyl methacryloxyacetate.
12. Polymeric methyl methacryloxyacetate.
13. Polyhydric alcohol esters of methacryloxy monocarboxylic aliphatic acids.
14. Polymeric polyhydric alcohol esters of methacryloxy monocarboxylic aliphatic acids.
15. Monohydric alcohol esters of methacryloxy polycarboxylic aliphatic acids.
16. Polymeric monohydric alcohol esters of methacryloxy polycarboxylic aliphatic acids.

DANIEL E. STRAIN.

CERTIFICATE OF CORRECTION.

Patent No. 2,141,546.   December 27, 1938.

DANIEL E. STRAIN.

It is hereby certified that error appears in the printed specification of the above numbered patent requiring correction as follows: Page 1, second column, line 42, for the word "for" read by; page 2, first column, line 56, for "precipitate" read precipitated; page 4, second column, line 59, claim 1, after the word "alkali" insert metal; and that the said Letters Patent should be read with this correction therein that the same may conform to the record of the case in the Patent Office.

Signed and sealed this 18th day of April, A. D. 1939.

Henry Van Arsdale
Acting Commissioner of Patents.

(Seal)

they contain, as a substituent in the acid portion of the molecule, the group

wherein R is a member of the group consisting of hydrogen and monovalent hydrocarbon radicals.

5. Polymers of the compounds of claim 4.
6. Coating compositions containing the products of claim 4.
7. Esters of methacryloxy monocarboxylic aliphatic acids.
8. Polymeric esters of methacryloxy monocarboxylic aliphatic acids.
9. Monohydric alcohol esters of methacryloxy monocarboxylic aliphatic acids.
10. Polymeric monohydric alcohol esters of methacryloxy monocarboxylic aliphatic acids.
11. Methyl methacryloxyacetate.
12. Polymeric methyl methacryloxyacetate.
13. Polyhydric alcohol esters of methacryloxy monocarboxylic aliphatic acids.
14. Polymeric polyhydric alcohol esters of methacryloxy monocarboxylic aliphatic acids.
15. Monohydric alcohol esters of methacryloxy polycarboxylic aliphatic acids.
16. Polymeric monohydric alcohol esters of methacryloxy polycarboxylic aliphatic acids.

DANIEL E. STRAIN.

CERTIFICATE OF CORRECTION.

Patent No. 2,141,546.                                December 27, 1938.

DANIEL E. STRAIN.

It is hereby certified that error appears in the printed specification of the above numbered patent requiring correction as follows: Page 1, second column, line 42, for the word "for" read by; page 2, first column, line 56, for "precipitate" read precipitated; page 4, second column, line 59, claim 1, after the word "alkali" insert metal; and that the said Letters Patent should be read with this correction therein that the same may conform to the record of the case in the Patent Office.

Signed and sealed this 18th day of April, A. D. 1939.

Henry Van Arsdale
(Seal)                                Acting Commissioner of Patents.